US010876596B1

(12) United States Patent
Bonny et al.

(10) Patent No.: US 10,876,596 B1
(45) Date of Patent: Dec. 29, 2020

(54) ELECTRIC MOTOR WITH COMPOUND PLANETARY GEAR DRIVE

(71) Applicant: Hydro-Gear Limited Partnership, Sullivan, IL (US)

(72) Inventors: Nathan W. Bonny, Shelbyville, IL (US); Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 16/457,243

(22) Filed: Jun. 28, 2019

Related U.S. Application Data

(60) Provisional application No. 62/692,256, filed on Jun. 29, 2018.

(51) Int. Cl.
*F16H 1/46* (2006.01)
*F16D 55/225* (2006.01)
(Continued)

(52) U.S. Cl.
CPC ............. *F16H 1/46* (2013.01); *F16D 55/225* (2013.01); *F16D 65/18* (2013.01); *F16D 65/186* (2013.01); *F16H 57/02* (2013.01); *H02K 7/003* (2013.01); *H02K 7/083* (2013.01); *H02K 7/102* (2013.01); *H02K 7/116* (2013.01); *H02K 7/1185* (2013.01); *H02K 11/215* (2016.01); *H02K 21/14* (2013.01); *F16D 2121/16* (2013.01);
(Continued)

(58) Field of Classification Search
CPC .......... F16H 1/46; F16H 1/2863; F16H 57/02; F16D 2121/16; F16D 2121/22; F16D 2121/64; F16D 55/225; H02K 7/003; H02K 7/083; H02K 7/102; H02K 7/116; H02K 7/1185; H02K 21/14; H02K 2211/03; H02K 11/215
USPC ........................................................ 475/342
See application file for complete search history.

(56) References Cited

U.S. PATENT DOCUMENTS 1,786,158 A    12/1930  Hawes
2,932,992 A *   4/1960  Larsh ........................ F16H 1/46
                                                    475/176
(Continued)

FOREIGN PATENT DOCUMENTS

DE    102011050571    10/2012
EP    3285377          2/2018

OTHER PUBLICATIONS

Bonfiglioli 605WE Wheel Drive Series with Electric Motor, Information Sheet, May 18, 2018, 1 p.
(Continued)

*Primary Examiner* — Leslie A Nicholson, III
(74) *Attorney, Agent, or Firm* — Neal, Gerber & Eisenberg LLP (57) ABSTRACT

A reduction drive has an electric motor and an output hub rotatable with respect to a motor housing. A planetary gear reduction assembly is disposed entirely within an internal volume formed by the output hub and includes a first ring gear fixed to and rotating with the output hub, a second ring gear fixed to a portion of the main housing, a sun gear driven by the motor shaft, and gears mounted on a carrier assembly and driven by the sun gear. Each planet gear has a first stage gear driving the first ring gear, and a second stage gear engaged to the second ring gear.

20 Claims, 11 Drawing Sheets

(51) Int. Cl.
*F16D 65/18* (2006.01)
*H02K 7/00* (2006.01)
*H02K 7/08* (2006.01)
*H02K 7/102* (2006.01)
*H02K 7/116* (2006.01)
*H02K 7/118* (2006.01)
*H02K 11/215* (2016.01)
*H02K 21/14* (2006.01)
*F16H 57/02* (2012.01)
*F16H 1/28* (2006.01)
*F16D 121/16* (2012.01)
*F16D 121/22* (2012.01)
*F16D 125/64* (2012.01)

(52) U.S. Cl.
CPC ...... *F16D 2121/22* (2013.01); *F16D 2125/64* (2013.01); *F16H 1/2863* (2013.01); *F16H 2057/02034* (2013.01); *H02K 2211/03* (2013.01)

(56) References Cited

U.S. PATENT DOCUMENTS

| | | | |
|---|---|---|---|
| 3,717,049 A | 2/1973 | Brandt | |
| 5,240,462 A * | 8/1993 | Mochizuki | ............ F16H 1/2863 475/341 |
| 5,593,360 A | 1/1997 | Ishida et al. | |
| 6,852,061 B2 | 2/2005 | Schoon | |
| 7,100,722 B2 | 9/2006 | Bowen | |
| 8,133,143 B2 | 3/2012 | Schoon | |
| 8,323,143 B2 | 12/2012 | Schoon | |
| 8,449,424 B2 | 5/2013 | Schoon | |
| 9,821,650 B2 | 11/2017 | Falls et al. | |
| 10,226,997 B2 * | 3/2019 | Huang | ............ H02K 7/08 |
| 10,432,064 B2 * | 10/2019 | Huang | ............ B62K 3/002 |
| 10,625,605 B2 * | 4/2020 | Isono | ............ F16D 65/186 |

OTHER PUBLICATIONS

E-Trac Drive Systems, Manual, AuburnGear, Jun. 2017, 10 pp.
Oerlikon Fairfield, Brochure, "Introducing the new E01H Electric Drive Solution," Date unknown but believed to be at least as early as Jun. 29, 2018, 6 pp.
Oerlikon Fairfield, Media Release, "Oerlikon Fairfield Assigned Patent for Development of Electric Wheel Drive," Feb. 15, 2013, 2 pp.
Heinzmann, Perm Technology, Electric Drives Product Catalog, Jan. 2016, 56 pp.
Rexroth, a Bosch Company, Press Release, "Emission-free mobility: Rexroth unveils drive for high-mileage electric vehicles," Jan. 28, 2019, 3 pp.
U.S. Appl. No. 16/518,025, filed Jul. 22, 2019, 27 pp.

* cited by examiner

ELECTRIC MOTOR WITH COMPOUND PLANETARY GEAR DRIVE

CROSS-REFERENCE

This application claims the benefit of U.S. Provisional Patent Application No. 62/692,256, filed on Jun. 29, 2018. This prior application is incorporated herein by reference in its entirety.

BACKGROUND OF THE INVENTION

This application relates to an electric planetary reduction drive incorporating an electric motor having a gear drive. Such a drive may be used for applications such as a ground drive for a scissors lift, boom lift or the like, although other applications are possible.

SUMMARY OF THE INVENTION

A compact planetary gear drive for an electric motor is disclosed herein. This design provides for a compound planetary gear assembly providing a summative reduction of the rotational speed of the electric motor output to an output hub. One benefit of the disclosed design is a reduced overall size and length of the drive. By way of example only, the planetary gear assembly is disposed entirely in the output hub to reduce envelope size. A further benefit of the drive disclosed herein is a limit on the amount of rollback in a vehicle in which the drive is used as a ground drive, which may be accomplished by limiting backlash in the drive. Various improvements for accomplishing these objectives are disclosed herein. Further benefits and features of the disclosure are set forth herein.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 1:
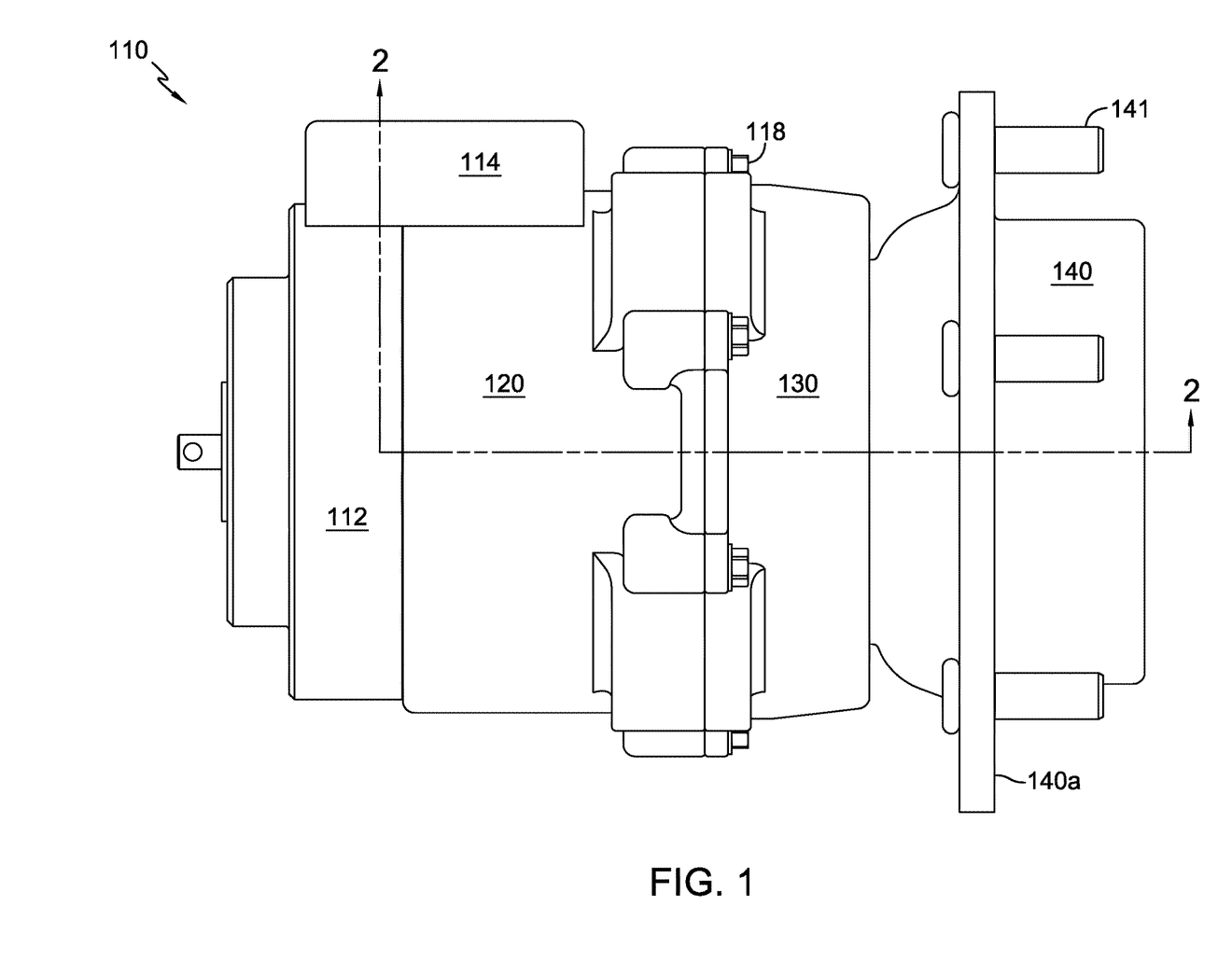
FIG. 1 is an external elevational view of an electric motor assembly including a planetary gear drive, in accordance with the disclosure herein.

An electric planetary reduction drive 110 as depicted in FIG. 1 includes a housing comprising a main housing 130 joined to motor housing 120 via fasteners 118 and using a seal 119. A spring biased electric brake 112 and power and control module 114 are attached to motor housing 120, and splines 125b are provided on output shaft 125 to engage electric brake 112. As will be explained in more detail, output hub 140 also serves as a planetary reduction housing, and includes standard wheel mounting fasteners 141 and wheel mounting flange 140a such that it can serve as a wheel hub.

Figure 2:
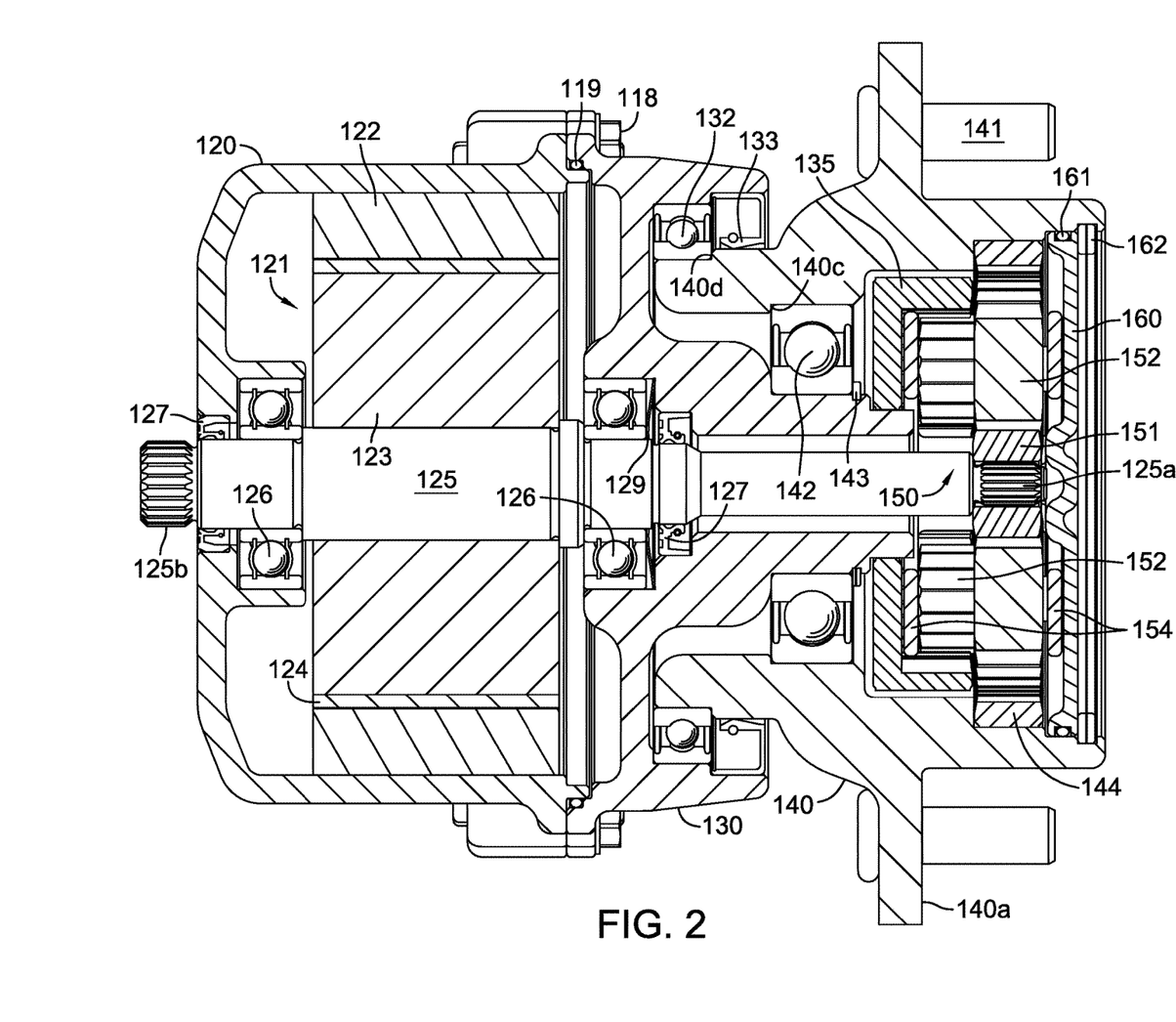
FIG. 2 is a cross-sectional view of the electric motor assembly of FIG. 1, along the line 2-2. It will be understood that certain elements of the assembly, such as brake 112 and power and control module 114 seen in FIG. 1, are not depicted in FIG. 2 for clarity.
Figure 3:
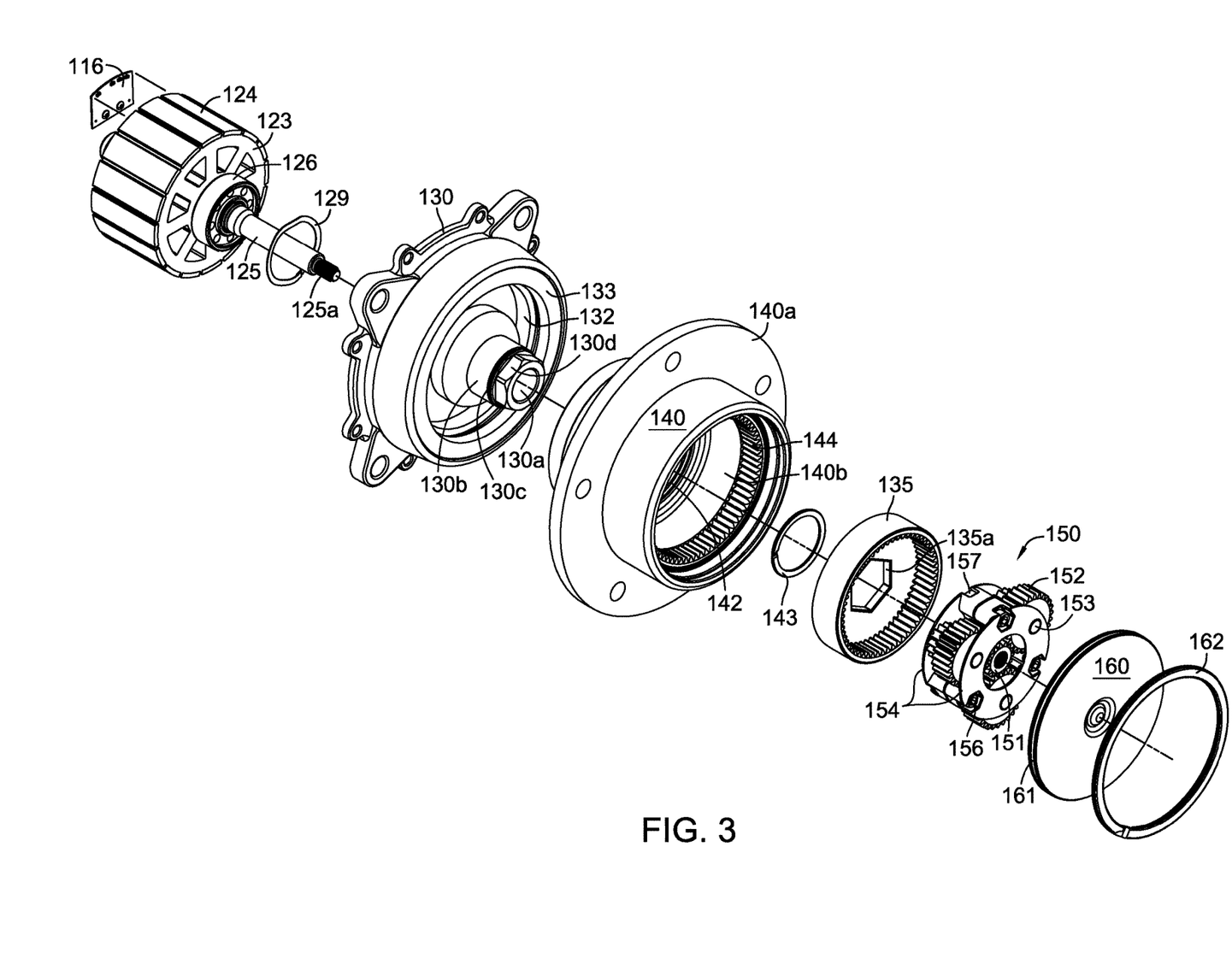
FIG. 3 is an exploded view of certain components of the electric motor assembly of FIG. 1.

As shown most clearly in FIGS. 2 and 3, a brushless electric motor 121 is disposed in motor housing 120, and comprises stator 122, rotor 123 and magnets 124. An output shaft 125 extends through motor 121 and is supported by a pair of bearings 126. Seals 127 are also provided adjacent the bearings 126. Splines 125a are provided on output shaft 125 to engage sun gear 151 as discussed below. As noted above, control module 114 and brake 112 are not depicted in the cross-sectional view of FIG. 2. Hall effect board 116 is also mounted to a surface of motor housing 120 in a manner to be appropriately located with regard to magnets 124. Wave spring 129 is disposed between bearing 126 and main housing 130 to provide an axial biasing force to the rotor 123 to keep rotor 123 biased towards Hall effect board 116 at start-up.

The structure of main housing 130 can be seen most clearly in FIG. 3. Main housing 130 includes a through opening 130a for output shaft 125. Seal 133 is disposed between output hub 140 and main housing 130. Bearing 132 is disposed in main housing 130. Retaining ring 143 is mounted in groove 130c and maintains ball bearing 142 in the proper location on bearing land 130b. It will be seen in FIG. 2 that shoulder 140d engages bearing 132, and shoulder 140c engages bearing 142, in a manner to retain the axial location of output hub 140.

A fixed ring gear 135 having an anti-rotation opening 135a is disposed internal to output hub 140 in a clearance pocket 140b, and mounted on a corresponding anti-rotation form 130d on main housing 130. While a hex is depicted for the anti-rotation forms, it will be understood that other shapes could be used.

Figure 4:
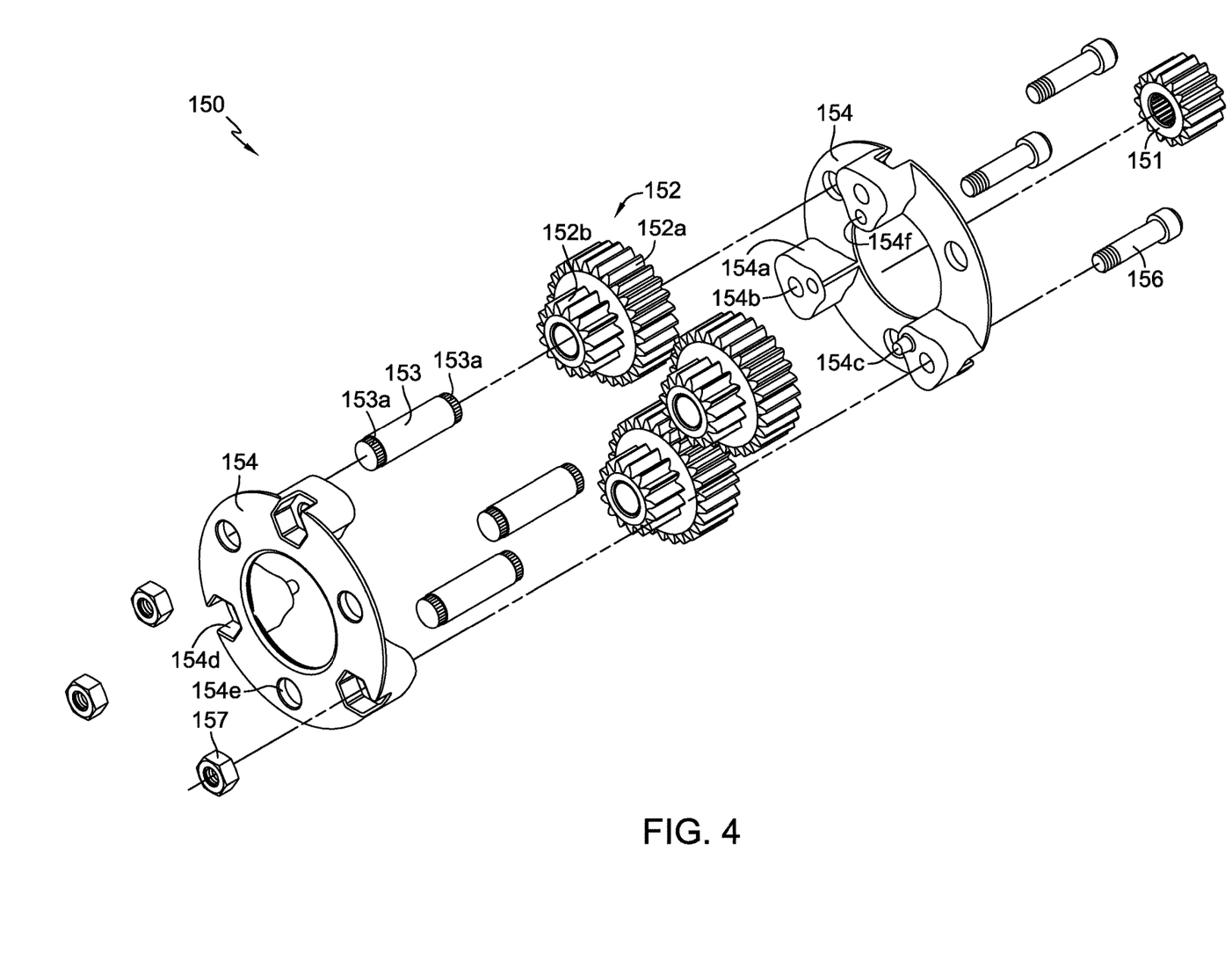
FIG. 4 is an exploded view of certain components of the planetary gear assembly of the electric motor assembly of FIG. 1.

Planetary gear assembly 150 comprises a pair of carrier plates 154 connected via carrier plate screws 156 extending through through-holes 154b and retained by carrier plate nuts 157. A plurality of recesses 154d is provided to accommodate the carrier plate nuts 157 to reduce envelope size for the carrier assembly. A projection pin 154c is formed on one of a plurality of projections 154a on each carrier plate 154 and engages a corresponding projection pin opening 154f on one of the projections 154a on the other carrier plate 154. As shown in FIG. 4, an extra pin opening 154f for the projection pins 154c is provided on one of the projections 154a to improve ease of assembly by allowing assembly in different positions. Sun gear 151 is mounted on output shaft 125 by means of splines 125a. Sun gear 151 drives the plurality of planet gears 152, each of which comprises a first stage gear form 152a and second stage gear form 152b. Planet gears 152 are each mounted on a respective carrier pin 153. Each carrier pin 153 is preferably composed of steel and has an optional raised spline 153a at each end to engage with pin support holes 154e of carrier plates 154. If carrier plates 154 are composed of, for example, aluminum, the raised splines 153a will deform the material adjacent its respective pin support holes 154e during assembly to assist in retaining carrier pins 153 in a non-rotatable fashion to reduce wear.

As seen most clearly in FIG. 2, planetary gear assembly 150 is disposed entirely within output hub 140. Retention plate 160, seal 161 and retaining ring 162 engage a portion of output hub 140 to assist in retaining the planetary gear assembly 150 in output hub 140. Second stage gear forms 152b engage and rotate against fixed ring gear 135, whereas first stage gear forms 152a engage and drive rotating ring gear 144, which is formed on or as part of output hub 140. It will be understood that ring gear 144 could be press fit into output hub 140 to simplify assembly, but it will also be understood that maintaining a proper press fit between ring gear 144 and output hub 140 without slippage under expected torque loads would be difficult. It will also be understood that planetary gear assembly 150 will rotate in the same direction as output shaft 125, whereas planet gears 152 will rotate in the opposite direction, such that planetary gear assembly 150 acts as both a speed reducer and torque amplifier for output hub 140.

Figure 5:
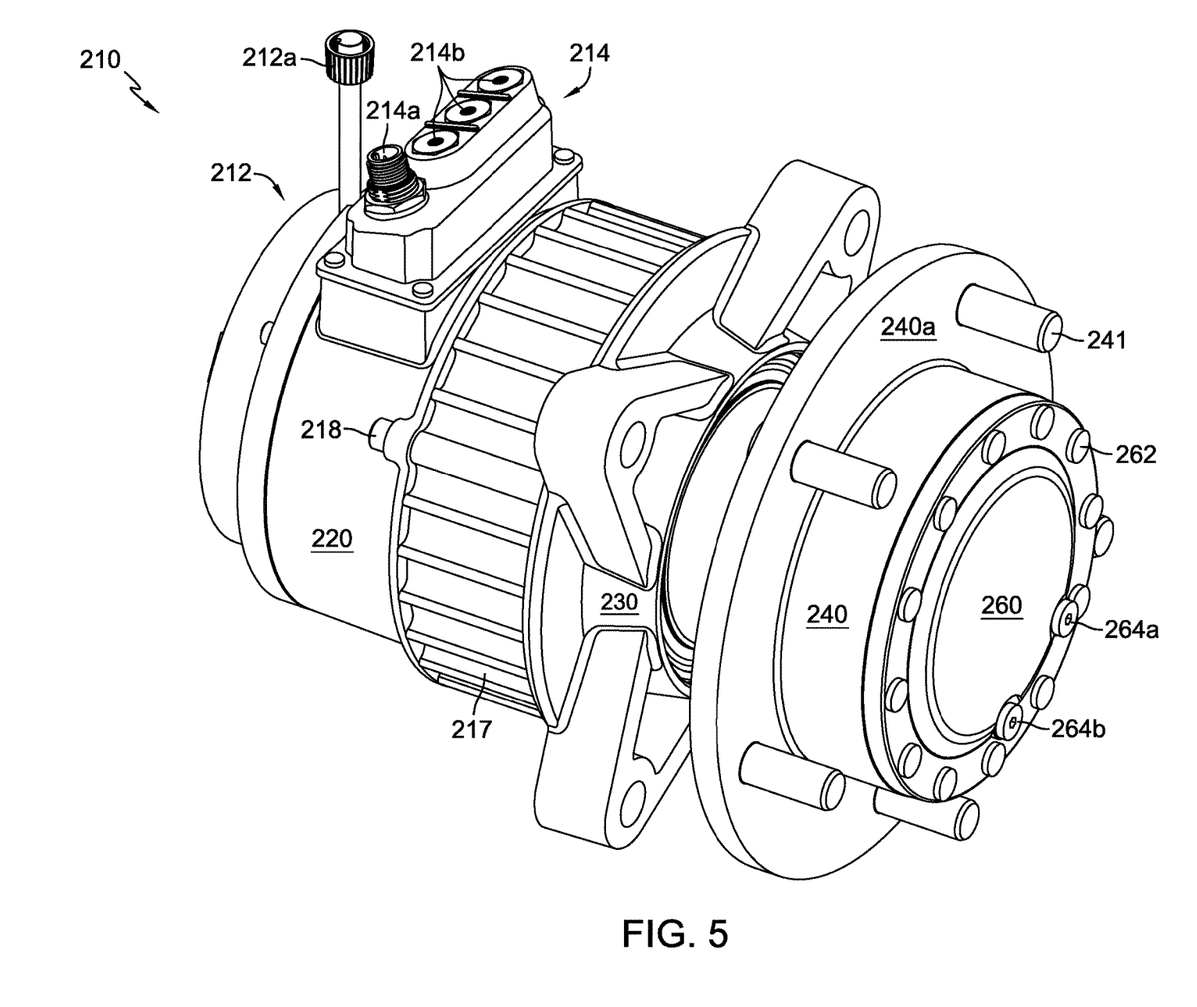
FIG. 5 is a perspective view of an electric motor assembly in accordance with a second embodiment of the disclosure herein.
Figure 6:
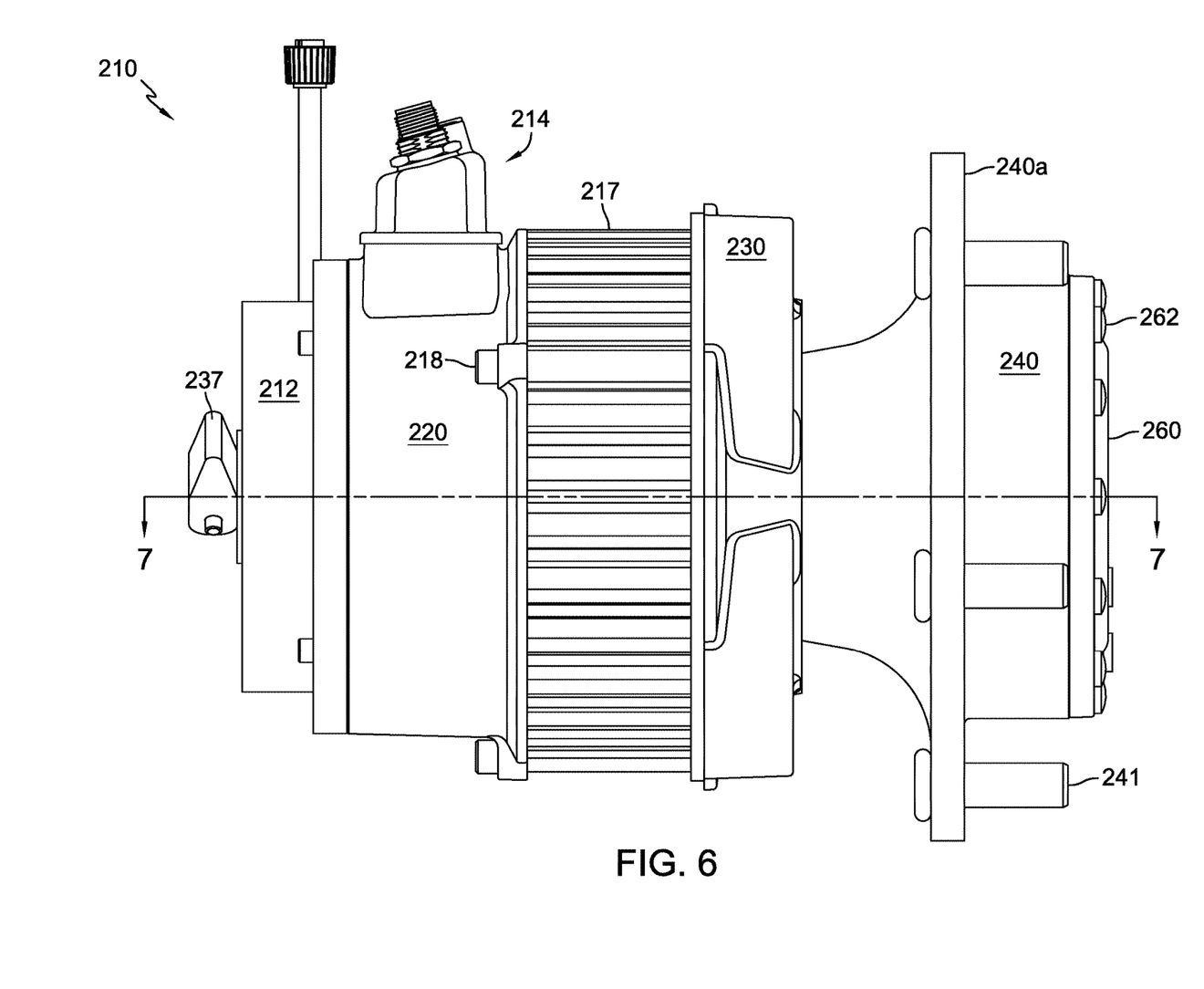
FIG. 6 is an external elevational view of the electric motor assembly of FIG. 5.

A second embodiment of an electric planetary reduction drive 210 is depicted in FIGS. 5-9. As seen in FIG. 5, a housing comprising a main housing 230 is joined to a second housing component 220 and motor stator housing 217 via fasteners 218. An electric brake 212 and power and control module 214 are attached to second housing component 220. Control module 214 includes a connector 214a for connection to a vehicle control system as may be required, and the connector 214a and associated Hall effect board (similar to Hall effect board 116 to which the connector 214a is wired) may be CAN-Bus capable when used with a CAN-Bus system. Power terminals 214b provide the necessary power inputs.

Output hub 240 also serves as a planetary reduction housing, and includes standard wheel mounting fasteners 241 and wheel mounting flange 240a such that it can serve as a wheel hub.

Figure 7:
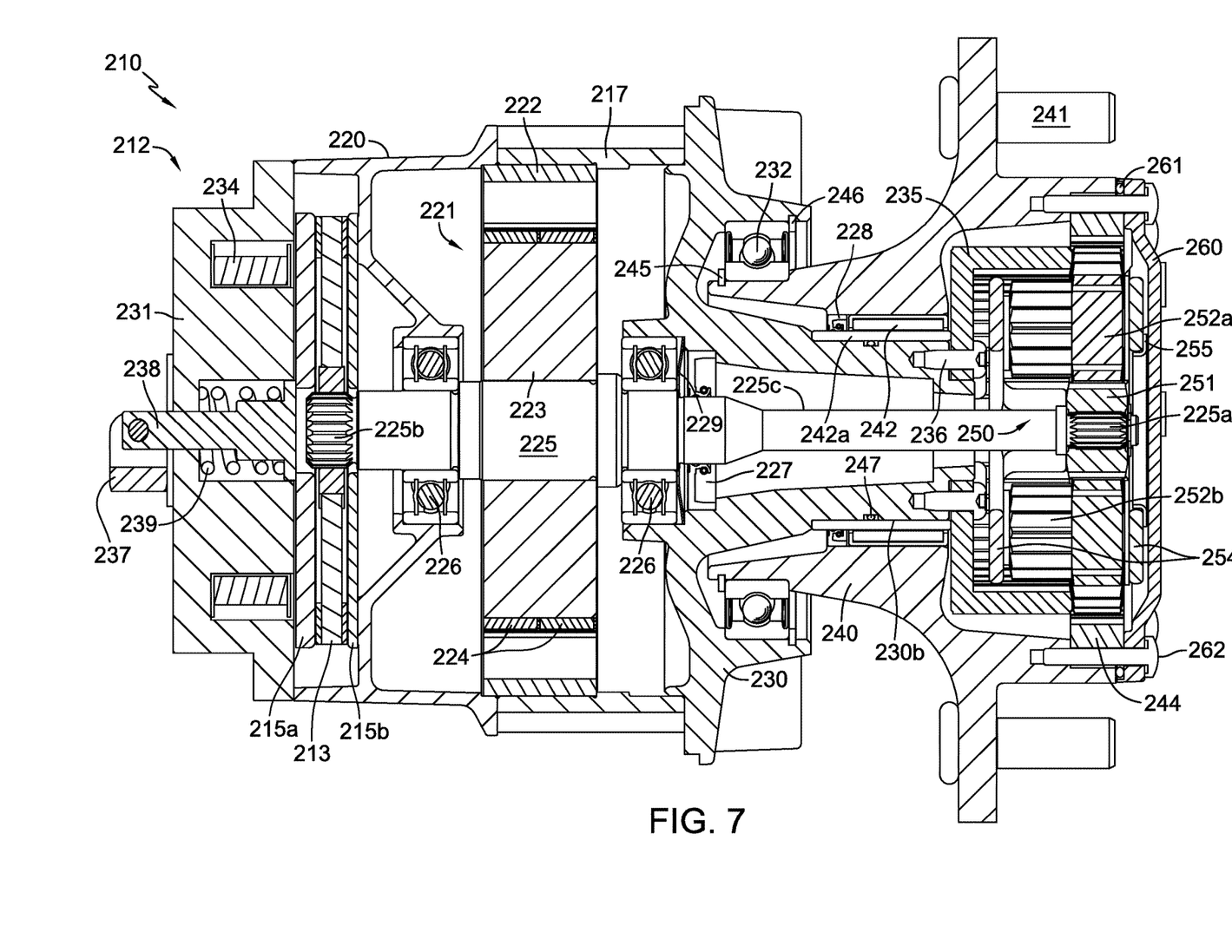
FIG. 7 is a cross-sectional view of the electric motor assembly of FIG. 5, along the line 7-7.
Figure 8:
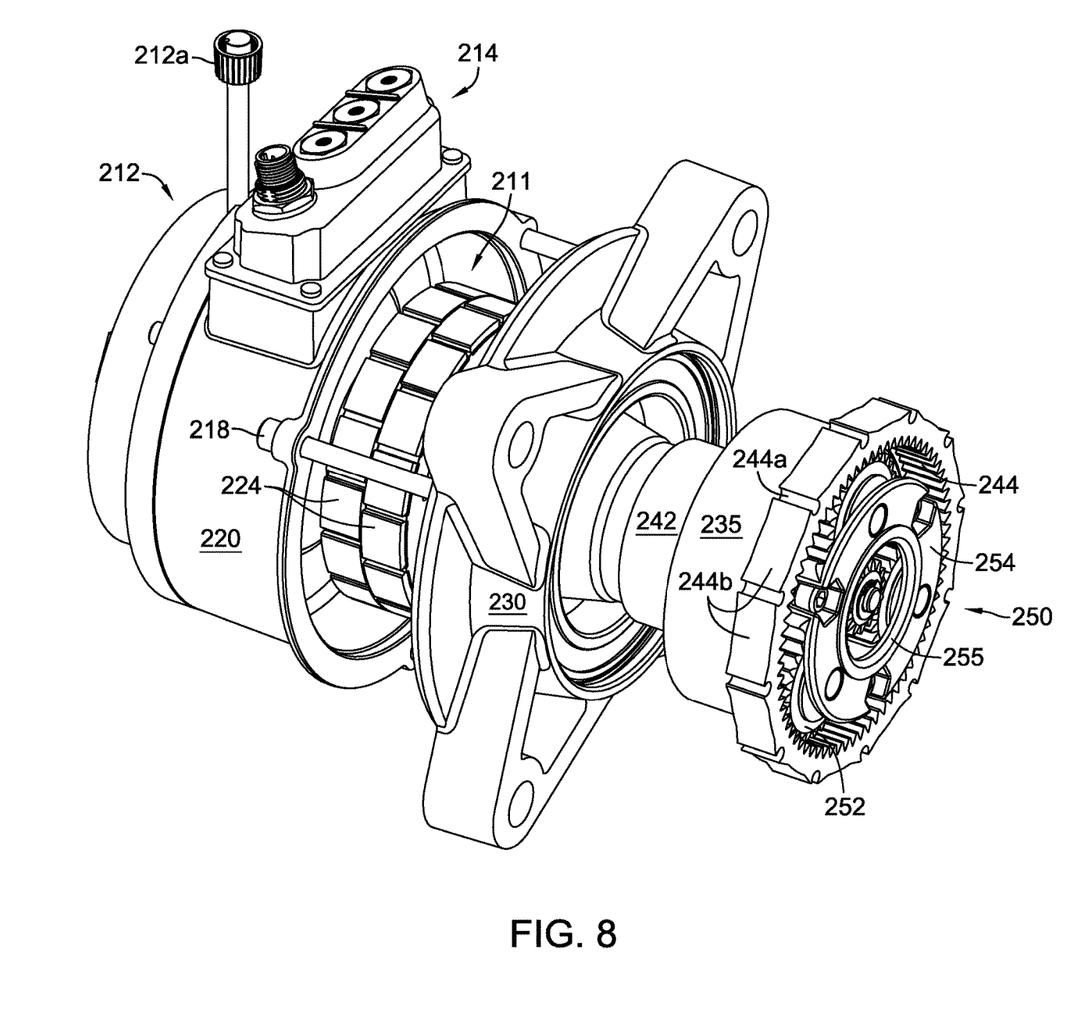
FIG. 8 is a perspective view of the electric motor assembly of FIG. 5, with certain external components removed for clarity.

As shown most clearly in FIGS. 7 and 8, electric motor 221 is disposed in motor stator housing 217 and second housing component 220, and comprises stator 222, rotor 223 and a skewed magnet rotor assembly 211 having skewed magnets 224. An output shaft 225 extends through electric motor 221 and is supported by a pair of bearings 226. A seal 227 is provided adjacent one of the pair of bearings 226. Splines 225a are provided on output shaft 225 to engage sun gear 251 as discussed below. A Hall effect board (not shown, but similar to Hall effect board 116) is also mounted to a surface of second housing component 220. Wave spring 229 is disposed between one of the pair of bearings 226 and output hub 240 to provide an axial biasing force to the rotor 223 to keep rotor 223 biased towards the Hall effect board at start-up, as discussed above.

Planetary gear assembly 250 comprises a pair of carrier plates 254 connected by means of carrier plate screws 256 and carrier plate nuts 257, and a plurality of carrier pins 253. Raised splines such as splines 153a are optional. Sun gear 251 is mounted on output shaft 225 by means of splines 225a and retaining ring 249. Retaining ring 249 assists in locating sun gear 251 and preventing contact with gear cover 260, described below. Flanged washer 255 is also provided between one of the carrier plates 254 and cover plate 260. Sun gear 251 drives the plurality of planet gears 252, each of which comprises a first stage gear form 252a and second stage gear form 252b, and second stage gear form 252b may be slip fit or press fit into first stage gear form 252a. Planet gears 252 are each mounted on a respective carrier pin 253.

Figure 9:
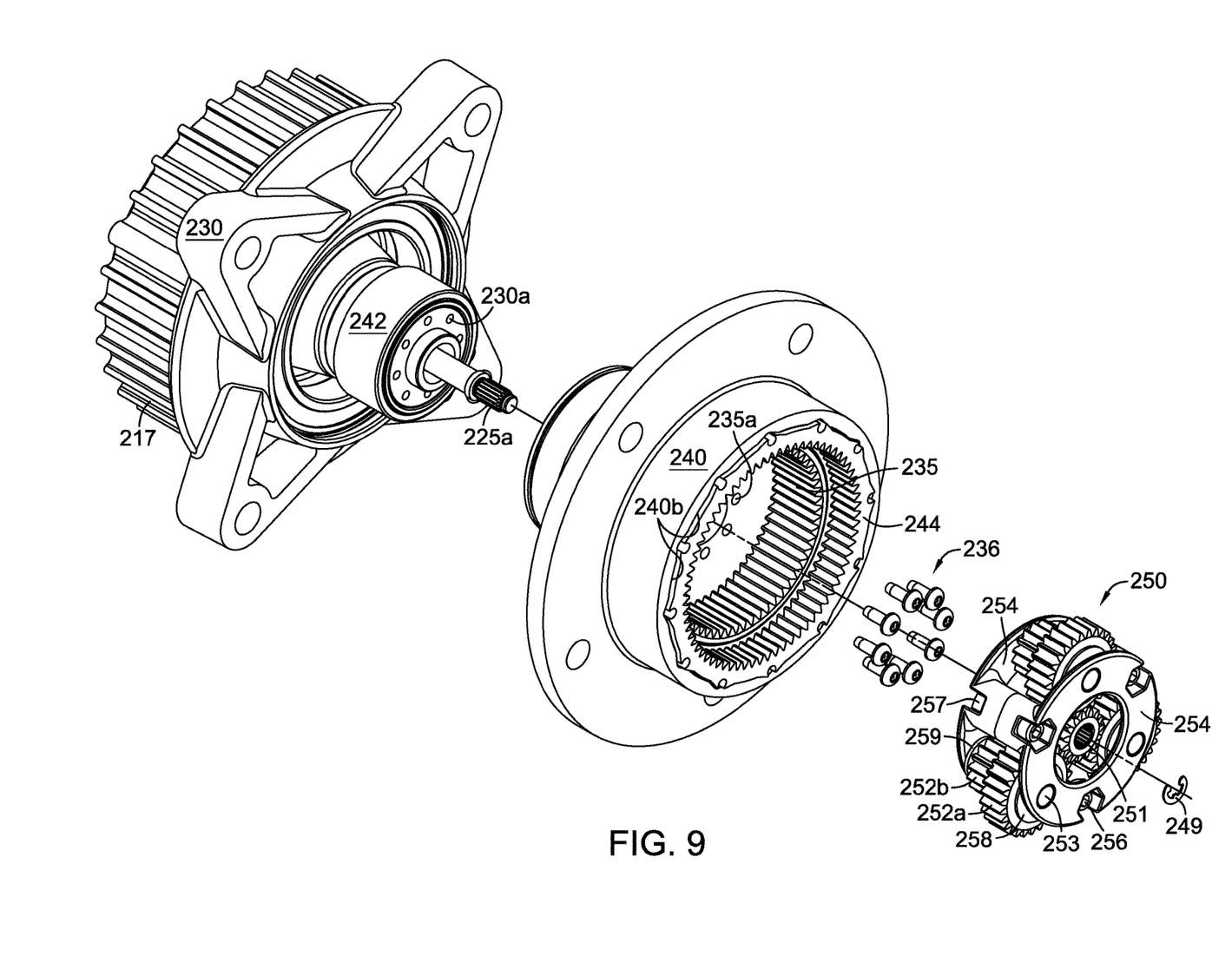
FIG. 9 is a partially exploded perspective view of the electric motor assembly of FIG. 5.

As seen in, e.g., FIGS. 7 and 9, planetary gear assembly 250 is disposed entirely within output hub 240 and comprises a first stage ring gear 244 and a fixed second stage ring gear 235. A difference from the first embodiment lies with the connection of first stage ring gear 244 and output hub 240. Small projections 244b on ring gear 244 with clearance fit into corresponding slots 240b in the output hub 240 can provide an anti-rotation feature but will necessarily add rotational backlash between the ring gear 244 and the output hub 240.

As noted before, it is desirable to minimize backlash, which is generated by various clearances within the system, including clearance at the brake rotor spline 225b, sun gear spline 225a, the mesh of sun gear 251, the mesh of the large planet gear 252a to large ring gear 244 and the mesh of small planet gear 252b to ring gear 235. In the second embodiment, the large ring gear 244 is clamped between gear cover 260 and output hub 240 by means of fasteners 262 extending through fastener recesses 244a formed on ring gear 244. This clamping arrangement allows the use of standard slip fit tolerances while eliminating this additional backlash between ring gear 244 and output hub 240.

Main housing 230 includes spindle 230b and attachment bores 230a for connecting ring gear 235 thereto via openings 235a by means of fasteners 236. This direct connection of ring gear 235 to main housing 230 also eliminates another source of backlash and improves performance.

Second stage gear forms 252b engage and rotate against fixed ring gear 235, whereas first stage gear forms 252a engage and drive rotating first stage ring gear 244, which is attached to and thereby causes rotation of the output hub 240. Thrust washers 258 and 259 are disposed between carrier plates 254 and first stage gear 252a and second stage gear 252b, respectively. It will be understood that planetary gear assembly 250 will rotate in the same direction as output shaft 225, whereas planet gears 252 will rotate in the opposite direction, such that planetary gear assembly 250 acts as both a speed reducer and torque amplifier for output hub 240.

Bearing 232 is disposed between main housing 230 and output hub 240, while needle roller bearing 242 is disposed between output hub 240 and spindle 230b of main housing 230. The inner race 242a of needle roller bearing 242 is retained by ring gear 235. Hub seal 228 and spindle seal 247 are provided to create the necessary seals, and retaining rings 245, 246 are used to assist in retaining proper alignment of the components.

As seen most clearly in FIGS. 5, 7 and 8, electric brake assembly 212 is primarily disposed inside a chamber formed by brake housing 231 secured to second housing component 220. Brake assembly 212 comprises a brake rotor 213 secured to splines 225b formed on output shaft 225. A pair of stators 215a and 215b is used to provide braking force to brake rotor 213. As seen in FIGS. 5 and 8, an electrical connector 212a connects brake 212 to an external power source and/or control system, and coil 234 is energized to remove the braking force from stators 215a and 215b. When coil 234 is deenergized, brake plunger 238 bears against stator 215a to translate stator 215a in an axial direction, with compression spring 239 providing the bias force. External manual brake release lever 237 is operable to overcome the bias force of compression spring 239 and disengage brake 212.

Output shaft 225 has a portion 225c having a reduced diameter from the rest of the shaft 225. When drive 210 is under load, for example when used as a vehicle drive and the vehicle weight is applied thereto, output hub 240 will deflect with respect to main housing 230, thus moving the center of planetary gear assembly 250 away from the center of output shaft 225. This reduced diameter portion 225c, which is preferably approximately 40% of the main portion, allows such flexing with reduced stress.

Upper oil fill port 264a and lower oil fill port 264b are provided to fill the chamber in which planetary gear assembly 250 is disposed. These fill ports 264a, 264b are located on cover plate 260 to act as drains when output hub 240 is rotated such that they are located at the bottom, and act as level indicators when output hub 240 is rotated such that they are vertically aligned.

Figure 10:
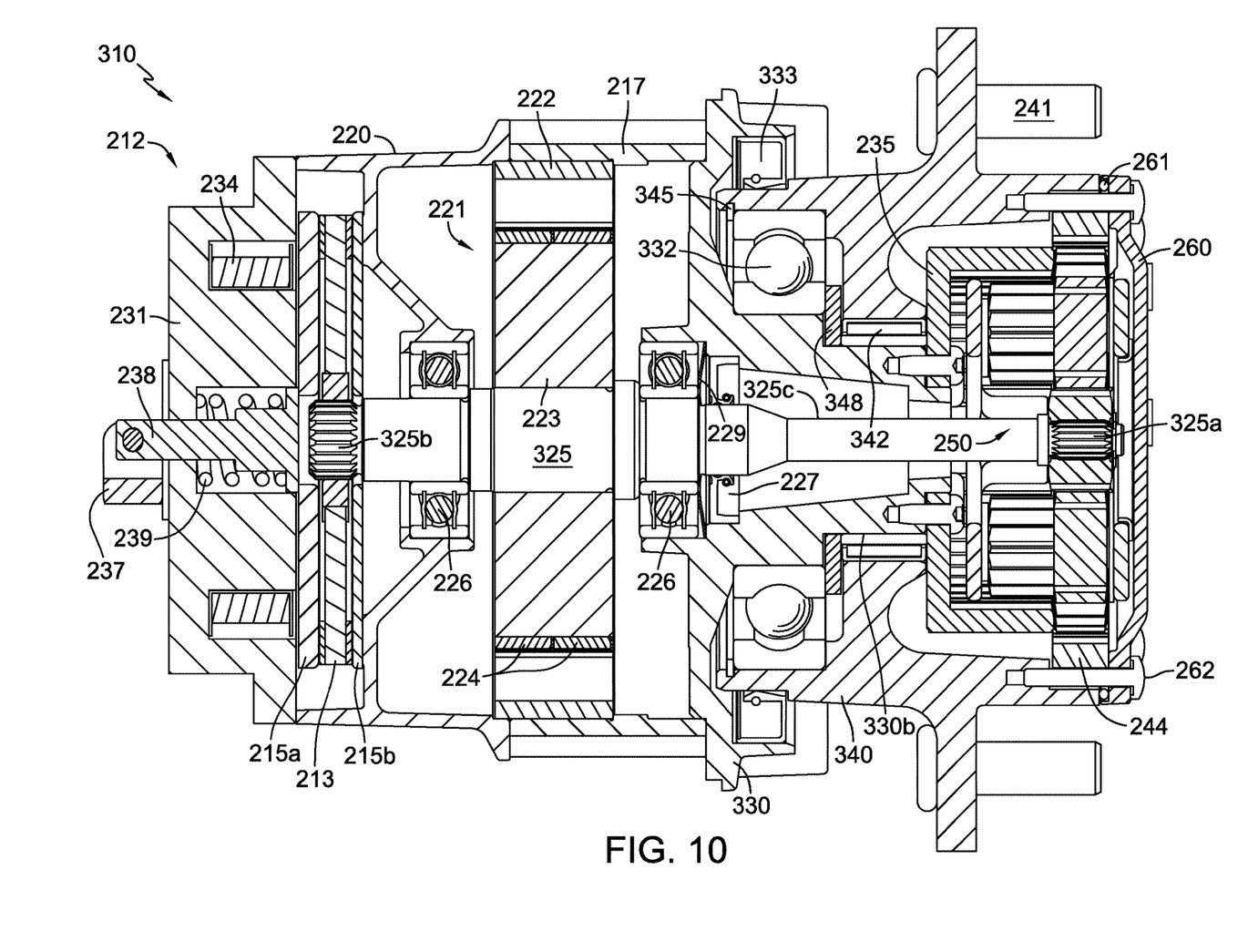
FIG. 10 is a cross-sectional view similar to that of FIG. 7, but depicting an electric motor assembly in accordance with a third embodiment of the disclosure herein.

A third embodiment of an electric planetary reduction drive 310 is depicted in FIG. 10. Elements of this embodiment that are identical or substantially identical with those of the second embodiment are given identical numerals and will not be discussed herein. By way of example only, planetary gear assembly 250 is the same as previously discussed. Spacer or washer 348 bears against the inner races of bearing 332 and needle roller bearing 342 (both of which are located internal to hub 340) to assist in retaining the inner races of bearings 332 and 342 in an axial direction with respect to housing 330. Needle roller bearing 342 is disposed between output hub 340 and spindle 330b. Retaining ring 345 holds bearing 332 axially in place within output hub 340 while seal 333 is located external to the output hub 340, similar to seal 133. This internal positioning of both bearing 332 and needle roller bearing 342, and use of a spacer 348 between the inner race of bearing 332 and needle roller bearing 342, eliminates the need for an equivalent of retainer 246 used in the prior embodiment, wherein bearing 232 was located external to the hub 240 and needle roller bearing 242 was located internal to the output hub 240. This eases assembly, as retainer 246 of the previous embodiment can be challenging to access. Output shaft 325 is modified slightly to accommodate the changes to the shapes of other components, and has a smaller diameter portion 325c as noted previously, a spline 325a to engage the sun gear 251 of planetary gear assembly 250, and a brake spline 325b to engage brake rotor 213 as discussed above.

Figure 11:
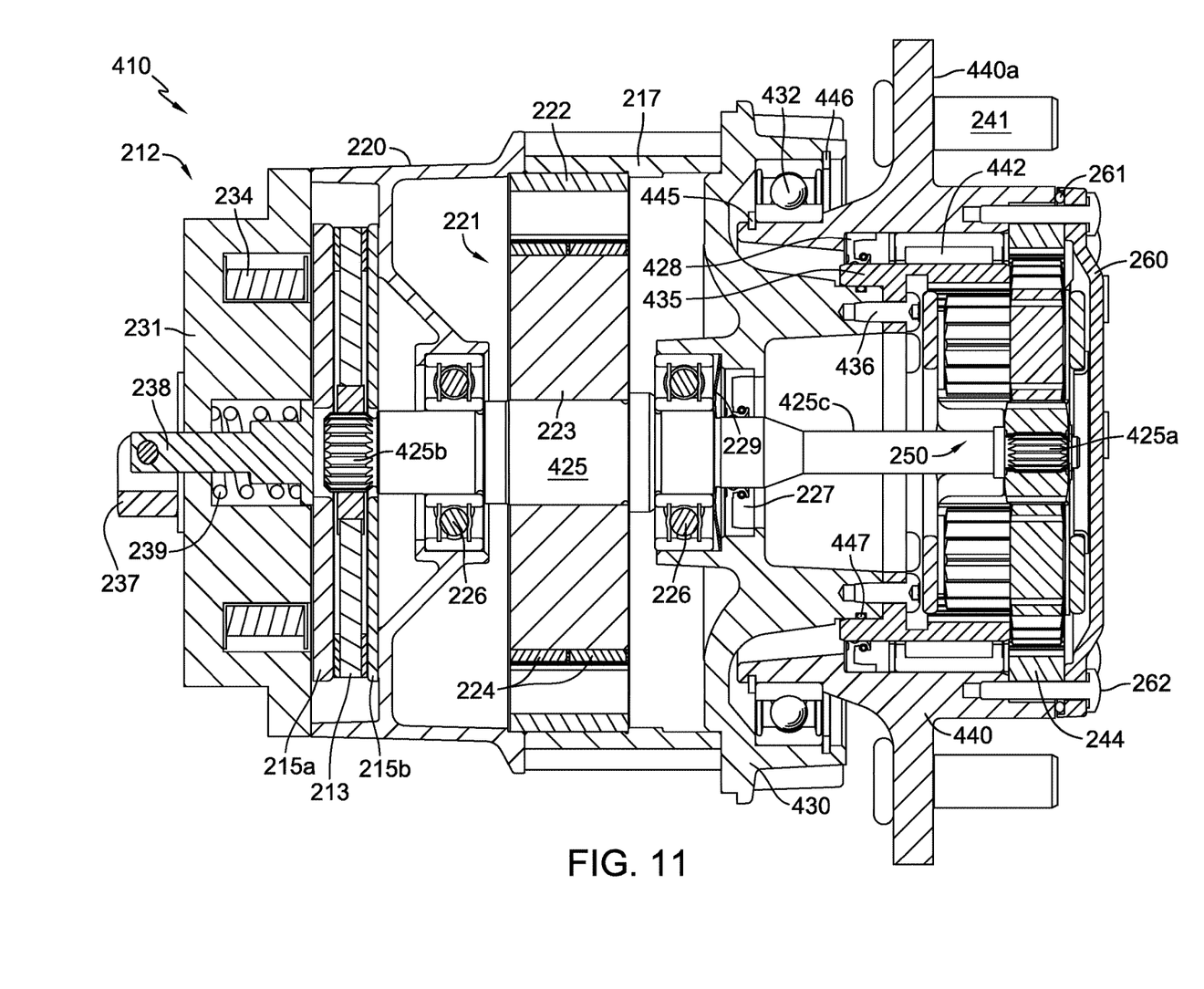
FIG. 11 is a cross-sectional view similar to that of FIG. 7, but depicting an electric motor assembly in accordance with a fourth embodiment of the disclosure herein.

A fourth embodiment of an electric planetary reduction drive 410 is depicted in FIG. 11. As with the third embodiment, elements that are identical or substantially identical with those of the second embodiment are given identical numerals and will not be discussed herein. By way of example only, planetary gear assembly 250 is the same as previously discussed. Motor output shaft 425 is modified slightly to accommodate changes to other components, and comprises a planetary gear spline 425a, a brake spline 425b and a reduced diameter portion 425c. Ring gear bearing 442, which preferably is a needle bearing, is mounted in output hub 440 on the outer diameter of ring gear 435, and output hub 440 thus runs on this ring gear bearing 442 and the outer diameter of ring gear 435. The ball bearing 432 with retaining rings 445 and 446 provides the axial retention between the main housing 430 and the output hub 440. The ring gear 435 is affixed to the main housing 430 with fasteners 436 while the spindle seal 447 and hub seal 428 provide the sealing between the main housing 430 and the output hub 440. As in prior embodiments, output hub 440 includes standard wheel mounting fasteners 241 and wheel mounting flange 440a such that it can serve as a wheel hub. One of skill in the art will realize that the size, number and placement of the fasteners disclosed herein, as well as the selection of the bearings disclosed herein, will vary depending on factors such as the expected load. In this embodiment, outboard bearing 442 is located closer to flange 440a such that bearing 442 is in the load plane of the wheel (not shown) attached to flange 440a, thereby reducing the reaction load on inboard bearing 432. This allows a shorter distance between these bearings thus reducing the overall length of the motor compared to the other embodiments.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A reduction drive assembly, comprising:
an electric motor disposed in a motor housing and driving a motor output shaft, the motor output shaft having a first spline at a proximal end thereof and a second spline at a distal end thereof;
a brake assembly comprising a brake housing engaged to the motor housing, a brake rotor engaged to the first spline of the motor output shaft and at least one brake stator;
an output hub that is disposed adjacent to a main housing and is rotatable with respect to the motor housing, the output hub forming an internal volume;
a planetary gear reduction assembly disposed entirely within the internal volume of the output hub, the planetary gear reduction assembly comprising:
a first ring gear connected to the output hub to rotate therewith; and
a first carrier plate engaged to a second carrier plate to form a carrier assembly;

a second ring gear non-rotatably fixed to a portion of the main housing;

a sun gear engaged to and driven by the motor output shaft; and a plurality of planet gears mounted on the carrier assembly and driven by the sun gear, each of the plurality of planet gears having a first stage gear form engaged to and driving the first ring gear, and a second stage gear form engaged to the second ring gear.

2. The reduction drive assembly of claim 1, further comprising a cover plate secured to the output hub by a plurality of fasteners.

3. The reduction drive assembly of claim 2, wherein the first ring gear comprises an outer circumference and a plurality of fastener recesses formed on the outer circumference thereof, wherein each of the plurality of fasteners engages one of the plurality of fastener recesses.

4. The reduction drive assembly of claim 1, wherein the motor output shaft has a first diameter adjacent the electric motor, and a second diameter adjacent the distal end of the motor output shaft, wherein the second diameter is less than the first diameter.

5. The reduction drive assembly of claim 1, wherein the second ring gear is fixed to the main housing by a plurality of fasteners extending through a portion of the second ring gear.

6. The reduction drive assembly of claim 1, further comprising a Hall effect board mounted to a first side of the electric motor.

7. The reduction drive assembly of claim 6, further comprising a wave spring disposed adjacent a second side of the electric motor, opposite the first side, and between the electric motor and the main housing, to provide an axial biasing force to a rotor of the electric motor, to keep the rotor biased towards the Hall effect board at start-up.

8. The reduction drive assembly of claim 1, further comprising a first bearing disposed between the output hub and the main housing, the first bearing having a first inner race and a first outer race, and a second bearing disposed between the output hub and a spindle portion of the main housing, the second bearing having a second inner race and a second outer race, and a spacer disposed between the first inner race and the second inner race to limit axial movement of the second bearing with respect to the main housing.

9. The reduction drive assembly of claim 1, further comprising a ring gear bearing disposed on an outer diameter of the second ring gear and between the second ring gear and the output hub, whereby the output hub runs on the ring gear bearing and the second ring gear.

10. The reduction drive assembly of claim 1, further comprising:

a first bearing disposed between a first portion of the main housing and a first shoulder formed on the output hub, and a second bearing contacting a second portion of the main housing and a second shoulder formed on the output hub, wherein the interaction of the first bearing and the first shoulder and the interaction of the second bearing and the second shoulder act to retain the output hub in a direction parallel to the axis of rotation of the motor output shaft.

11. The reduction drive assembly of claim 1, wherein the first ring gear is formed as part of the output hub.

12. The reduction drive assembly of claim 10, further comprising a Hall effect board mounted adjacent to a first side of the electric motor.

13. The reduction drive assembly of claim 12, further comprising a wave spring disposed adjacent to a second side of the electric motor, opposite the first side, and between the electric motor and the main housing, to provide an axial biasing force to a rotor of the electric motor, to keep the rotor biased towards the Hall effect board at start-up.

14. A reduction drive assembly, comprising:

an electric motor disposed in a motor housing and driving a motor output shaft, the motor output shaft having a first spline at a proximal end thereof and a second spline at a distal end thereof, and wherein the motor output shaft has a first diameter adjacent the proximal end, and a second diameter adjacent the distal end, wherein the second diameter is less than the first diameter;

a brake assembly comprising a brake housing engaged to the motor housing, a brake rotor engaged to the first spline of the motor output shaft, and at least one brake stator;

an output hub that is disposed adjacent to a main housing and is rotatable with respect to the motor housing, the output hub forming an internal volume;

a first ring gear connected to the output hub to rotate therewith;

a first carrier plate engaged to a second carrier plate to form a carrier assembly;

a second ring gear non-rotatably fixed to a portion of the main housing by a plurality of fasteners extending through a portion of the second ring gear;

a sun gear supported in the carrier assembly and engaged to and driven by the motor output shaft; and a plurality of planet gears mounted on the carrier assembly and driven by the sun gear, each of the plurality of planet gears having a first stage gear form engaged to and driving the first ring gear, and a second stage gear form engaged to the second ring gear, wherein the carrier assembly, the plurality of planet gears, the sun gear, the first ring gear and the second ring gear are all disposed within the internal volume of the output hub.

15. The reduction drive assembly of claim 14, wherein the second diameter of the motor output shaft is approximately 40% of the first diameter.

16. The reduction drive assembly of claim 14, further comprising a manual brake release lever disposed external to the brake housing and operable to manually disengage the brake rotor from the at least one brake stator.

17. The reduction drive assembly of claim 14, further comprising a cover plate secured to the output hub by a plurality of cover plate fasteners.

18. The reduction drive assembly of claim 17, wherein the first ring gear comprises an outer circumference and a plurality of fastener recesses formed on the outer circumference thereof, wherein each of the plurality of cover plate fasteners engages one of the plurality of fastener recesses.

19. The reduction drive assembly of claim 1, further comprising a motor stator housing that is positioned between and joined to the motor housing and the main housing.

20. The reduction drive assembly of claim 14, further comprising a motor stator housing that is positioned between and joined to the motor housing and the main housing.

* * * * *